United States Patent [19]

Umeda et al.

[11] Patent Number: 4,586,790
[45] Date of Patent: May 6, 1986

[54] DISPLAY PANEL HAVING UNIAXIALLY-STRETCHED ORGANIC POLYMER FILM AS THE SUBSTRATE

[75] Inventors: Takao Umeda, Hitachi; Takao Miyashita, Kumagaya; Yuzuru Shimazaki, Hitachi; Tatsuo Igawa, Kitaibaraki; Ken Sasaki; Shigeru Matsuyama, both of Mobara, all of Japan

[73] Assignee: Hitachi, Ltd., Tokyo, Japan

[21] Appl. No.: 466,488

[22] Filed: Feb. 15, 1983

[30] Foreign Application Priority Data

Feb. 22, 1982 [JP] Japan ................................ 57-26111

[51] Int. Cl.[4] .............................................. G02F 1/13
[52] U.S. Cl. ................................ 350/337; 350/339 R
[58] Field of Search ........................ 350/337, 339 R

[56] References Cited

U.S. PATENT DOCUMENTS

| | | | |
|---|---|---|---|
| 3,869,196 | 3/1975 | Kubota | 350/337 |
| 4,217,160 | 8/1980 | Perregaux | 350/337 X |
| 4,388,375 | 6/1983 | Hopper et al. | 350/337 X |

FOREIGN PATENT DOCUMENTS

| | | | |
|---|---|---|---|
| 0148548 | 11/1979 | Japan | 350/337 |
| 55-35325 | 3/1980 | Japan . | |
| 0135816 | 10/1980 | Japan | 350/337 |
| 56-97318 | 8/1981 | Japan . | |

Primary Examiner—John K. Corbin
Assistant Examiner—Richard F. Gallivan
Attorney, Agent, or Firm—Antonelli, Terry & Wands

[57] ABSTRACT

In a display panel consisting essentially of a pair of substrates whose opposed surfaces are equipped with transparent conductive layers and at least one of which consists of an organic polymer film, and of a display member interposed between said pair of substrates, the improvement wherein said organic polymer film is a uniaxially stretched polyester film.

7 Claims, 19 Drawing Figures

DISPLAY PANEL HAVING UNIAXIALLY-STRETCHED ORGANIC POLYMER FILM AS THE SUBSTRATE

BACKGROUND OF THE INVENTION

This invention relates to a display panel having an organic polymer film.

In conventional dispaly panels, a display member such as a liquid crystal or a stron dielectric is interposed between a pair of glass substrates. To reduce the size and weight of the display panels, however, the use of a organic polymer film as the substrate has been proposed in recent years.

FIG. 1 illustrates the structure of a conventional reflection type liquid crystal display panel.

FIG. 1(a) is a plan view and FIG. 1(b) is a sectional view taken along line A—A' of FIG. 1(a).

In the drawings, reference numerals 1a and 1b represent the organic polymer film substrates; 2a and 2b are electrodes of transparent conductive layers consisting of a mixture of 95 wt % $In_2O_3$ and 5 wt % $SnO_2$ that are disposed on the opposed surfaces of the substrates 1a, 1b; 3 is an electrode terminal for connecting the electrodes 2a, 2b to an external circuit; 4 is an orientation film; 5 is an epoxy-type adhesive used for bonding the periphery of the substrate 1a, 1b; 6 is a liquid crystal sealed between the substrates 1a, 1b; and 7 is a reflecting plate. Though not shown in the drawings, polarizers are disposed on the non-opposing surfaces of the substrates 1a, 1b, whenever necessary. Reference numeral 8 represents incident light. Symbol d represents the deviation between a virtual image 9 and a real image 10 while symbol $\phi$ represents a viewing angle.

To use the organic polymer film as the substrate for the display panel, the following requirements must be satisfied:

(1) The film must be highly heat-resistant.

(2) It must also be highly resistant to acid and alkali.

(3) It must have high mechanical strength. If so, gap control can be easily made between the substrates and the thickness of the substrate can be reduced, thus making it possible to reduce also the size and weight of the display panel. The deviation d between the virtual image 9 and the real image 10 can be reduced by reducing the thickness of the substrate in the case of the reflection type display panel.

(4) It must have high light transmittance.

(5) It must have high viewing angle dependence of the display quality. In other words, its light transmittance must not drop even if the viewing angle $\phi$ becomes great.

(6) The transparent conductive layer must not be viewed from outside. The reflectivity R of the conductive layer is expressed by the following equation:

$$R = [(n_e - n_s)/(n_e + n_s)] \quad (1)$$

where $n_e$: refractive index of the transparent conductive layer 2 ($\approx 2.0$)

$n_s$: maximum refractive index of the substrate 1.

The smaller this reflectivity R, the smaller becomes the possibility that the transparent conductive layer can be seen from outside, and the higher becomes the display quality.

The maximum refractive index $n_s$ of the substrate will now be explained. A stretched organic polymer film literally means a organic polymer film produced by the stretching operation. After passing through the stretching operation, the stretched organic polymer film has by far higher transparency and mechanical strength than an unstretched organic polymer film. However, stretching of the film results in the occurrence of molecular orientation and the film becomes optically anisotropic. FIG. 2 is useful for explaining this phenomenon. FIG. 2(a) depicts a biaxially stretched film that is stretched in two directions, i.e, A—A' and B—B', while FIG. 2(b) depicts a uniaxially stretched film that is stretched only in one direction, that is, A—A'. In either case, three kinds of slow and fast principal axes of birefringence a, b and c exist and have refractive indices $n_a$, $n_b$ and $n_c$, respectively. The maximum refractive index $n_s$ is defined as the greatest of these three refractive indices.

(7) The maximum refractive index $n_s$ of the substrate must be great. In other words, the deviation d between the virtual image 9 and the real image 10 can be reduced in case the display panel is of the reflection type.

(8) If the display member consists of a liquid crytal, the film must have high resistance to dissolution in the liquid crystal.

(9) If the display member consists of the liquid crystal, the film must have high solvent resistance because an organic solvent is used in forming the orientation film 4.

As the organic polymer films for use as the substrates of the display panel, acryl resin films produced by uniaxial stretching methods, tri-acetylcellulose films produced by uniaxial stretching methods, polystyrene films produced by uniaxial stretching methods (see: Japanese Patent Laid-Open No. 97318/1981), and polyester films produced by biaxial stretching methods have been known conventionally.

As will be described elsewhere, however, none of these prior art films can entirely satisfy the requirements (1) through (6), especially the requirements (1) through (7) if the display panel is of the reflection type and the requirements (1) through (6) and the requirements (8) and (9) if the display member consists of the liquid crystal.

SUMMARY OF THE INVENTION

It is therefore an object of the present invention to provide a display panel equipped with organic polymer films which can eliminate the drawbacks of the prior art described above and can satisfy the requirements (1) through (6) with the requirement (7) if the display panel is of the reflection type and with the requirements (8) and (9) if the display member consists of the liquid crystal.

The inventors of the present invention have examined the organic polymer films for use in the substrate from various aspects and have found that a display panel can be obtained which can satisfy the requirements (1) through (6) with the requirement (7) if the display panel is of the reflection type and with the requirements (8) and (9) if the display member consists of the liquid crystal, by use of polyester films produced by uniaxial stretching methods. The present invention is completed on the basis of this finding, as will be described in further detail in the paragraph to follow.

The inventors of the present invention examined various properties of the uniaxially stretched polyester films to be used in the present invention in comparison with those of the uniaxially stretched acryl resin films, uniaxially stretched tri-acetylcellulose films and uniaxially stretched polystyrene films in accordance with the prior art. The major points of the investigation corrspond to the requirements (1) through (9) for the display panel and the results are shown in Table 1, in which numerals (1) through (9) correspond to those of the requirements. In Table 1, continuous heat-resistance temperature is an evaluation function that represents the heat-resistance and tensile strength is an evaluation function that represents mechanical strength.

TABLE 1

|  | uniaxially stretched polyester film | uniaxially stretched acrylic film | uniaxially stretched tri-acetyl-cellulose film | uniaxially stretched polystyrene film | biaxially stretched polyester film |
|---|---|---|---|---|---|
| (1) continuous heat-resistant temperature | 150° C. | 60° C.–88° C. | 150° C. | 93° C. | 150° C. |
| (2) acid- & alkali resistance |  | Δ | Δ |  |  |
| (3) tensile strength (Kg/mm$^2$) | 30 | 5–7 | 10–13 | 6.3–8.4 | 20 |
| (4) light transmittance | 95% | 92% | 87%–90% | 93% | 95% |
| (5) viewing angle characteristics | good | bad | bad | bad | bad |
| (6) refractive index | 1.7 or more | 1.48–1.53 | 1.487 | 1.60 | 1.67 |
| (7) $\eta$s |  |  |  |  |  |
| (6) reflectivity R of transparent conductive layer | 8.1 or below | 13.3–14.9 | 14.7 | 11.1 | 9.0 |
| (8) resistance to dissolution by liquid crystal |  | X | X | Δ |  |
| (9) solvent resistance |  | X | X | X |  |

: Dissolution and corrosion did not occurred.
Δ: Dissolution and corrosion occured partly.
X: Dissolution and corrosion occurred.
Reflectivity R of the transparent conductive layer:

$$R = \frac{n_e - n_s}{n_e + n_s} \times 100$$

$n_e$: refractive index of the transparent conductive layer ($\approx 2.0$)

It can be appreciated from Table 1 that the uniaxially stretched polyester film to be used in the present invention satisfies the requirements (1) through (6) for the display panel and the requirement (7) if the display panel is of the reflection type and the requirements (8) and (9) if the display member is the liquid crystal.

These and other objects and features of the present invention will become more apparent from the following detailed description to be taken in conjunction with the accompanying drawings.

DESCRIPTION OF THE PREFERRED EMBODIMENTS

The present invention will be described according to an embodiment thereof as follows:

EMBODIMENT 1

Figure 1A:
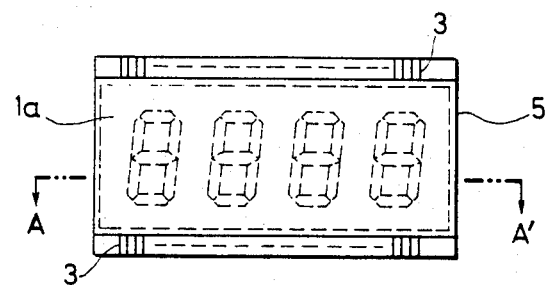
FIGS. 1(a) and 1(b) are a schematic plan view and a schematic sectional view of the typical display panel of the prior art.
Figure 1B:
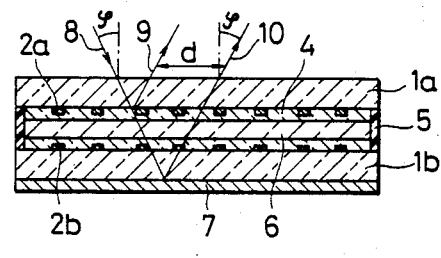
Figure 2A:
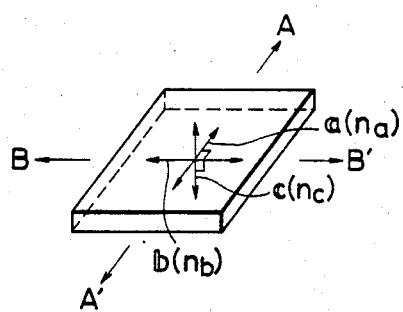
FIGS. 2(a) and 2(b) are perspective views of the stretched plastic films.
Figure 2B:
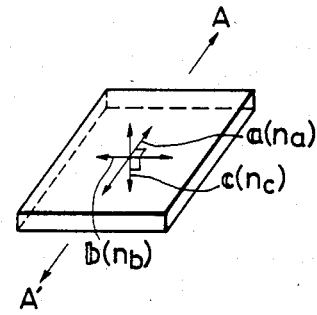
Figure 3A:
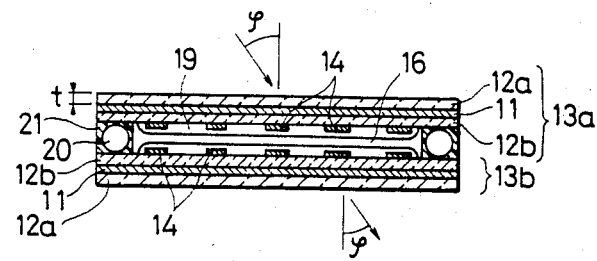
FIGS. 3(a) and 3(b) are a schematic sectional view and a schematic plan view of the first embodiment of the present invention.

FIG. 3 is a sectional view and a plan view showing the first embodiment of the present invention.

Two uniaxially stretched polyester films 12a, 12b each having a thickness t (=100 μm) and a polarizer 11 prepared by placing a dichroic pigment (iodine, methyl red or the like) into a PVA (polyvinyl alcohol) type film are laminated by a polyester type adhesive to form each of composite films 13a and 13b. The composite films 13a, 13b are about 280 μm thick. A 400 Å thick transparent conductive layer 14 (a mixture of $In_2O_3$ 95 wt %, $SnO_2$ 5 wt % or the like) is vacuumevaporated on the film surface at 70° C. by low temperature spattering. A display pattern is etched to form a substrate.

Next, a 2% cyclohexanone solution of a polyamide resin type is coated on the display pattern surface by spinner and is dried at 100° C. for 10 minutes, forming an 800 Å thick resin film. The film surface is rubbed in the direction of the polarization axis by use of a buffing cloth to form an orientation film 19.

Figure 3B:
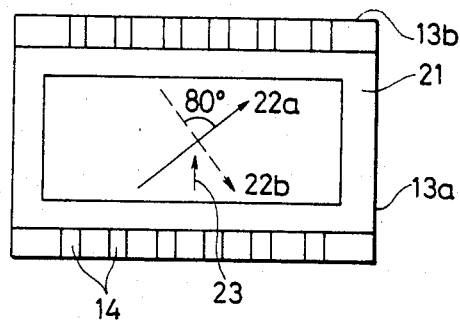

After the rubbing treatment, the two substrates 13a, 13b are assembled using a sealant 21 with a combination of the rubbing directions such as shown in FIG. 3(b). Reference numeral 22a represents the rubbing direction of the upper substrate 13a and 22b does that of the lower substrate 13b. The twist angle is 80° in this case. The sealant 21 is prepared by mixing a glass fiber 20 as a spacer with a polyester type adhesive. Next, a liquid crystal 16 (nematic liquid crystal "ZLI-1132" of Merck Co.) is sealed, thereby completing a transmission type display panel. The viewing direction of the resulting display panel is represented by reference numeral 23 and this display panel is suitable for a pocketable electronic calculator or for a game display panel. A reflection type display panel can be obtained by disposing a reflecting plate adjacent to the substrate 13b.

In this embodiment, since the substrates 13a, 13b are composed of the uniaxially stretched polyester film, all the aforementioned requirements (1) through (7) imposed on the display panel can be altogether satisfied. Since the display member consists of the liquid crystal, further, the requirements (8) and (9) can be also satisfied, and the requirement (7) can be satisfied if the display panel is of the reflection type.

Since the substrates 13a, 13b are equipped with the polarizers 11, they also serve as the polarizing plates, thus making it possible to reduce the size of the display panel. In this instance, the polarizer 11, which is otherwise weak both mechanically and chemically, is interposed between the two uniaxially stretched polyester films 12, all the mechanical strength, acid resistance, alkali resistance, heat resistance, liquid crystal dissolution resistance and solvent resistance can be improved.

Next, detailed explanation will be made on the difference of the light transmittance between the uniaxially stretched polyester film to be used in this embodiment and the biaxially stretched polyester film which shows the second best characteristics in Table 1.

Table 2 illustrates the results of measurement of the refractive indices $n_a$, $n_b$ and $n_c$ between the uniaxially stretched film used in the present invention and the biaxially stretched polyester film used in the prior art.

TABLE 2

| | Biaxially stretched polyester film | Uniaxially stretched polyester film |
|---|---|---|
| $n_a$ | 1.67 | >1.7 |
| $n_b$ | 1.62 | 1.60 |
| $n_c$ | 1.49 | 1.49 |

Figure 4:
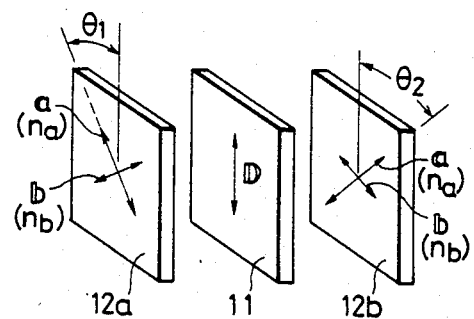
FIG. 4 is a perspective view showing the relation between the polarization axis and the slow and fast principal axes of birefringence of the composite film 13 in FIG. 3.

The difference $\Delta n_{ab}$ between $n_a(=n_s)$ and $n_b$ is greater in for the uniaxially stretched polyester film. When the composite film 13 such as shown in FIG. 3 is produced using such an optically anisotropic, uniaxially stretched polyester film, the angles $\theta_1$, $\theta_2$ defined between the direction D of the axis of polarization of the polarizer 11 and the slow and fast principal axis of the uniaxially stretched polyester film 12, which as the greatest refractive index among the three principal axes, as shown in FIG. 4, become important. For, when an optically anisotropic member is combined with the polarizer 11, the color of interference would occur due to birefringence unless a suitable combination is selected. In such a case, the contrast ratio would drop and the display quality would be remarkably reduced.

Figure 5A:
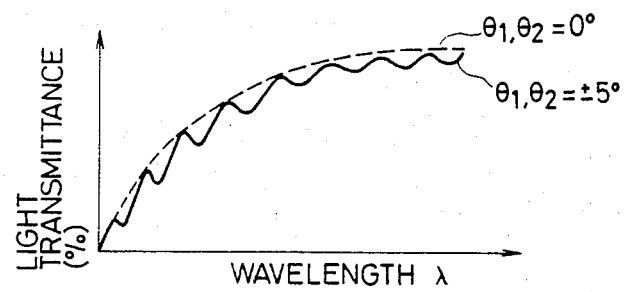
FIGS. 5(a) and 5(b) are diagrams showing the wavelength dependence of the light transmittance when $\phi = 0$ in the prior art and in the first embodiment of the present invention.
Figure 5B:
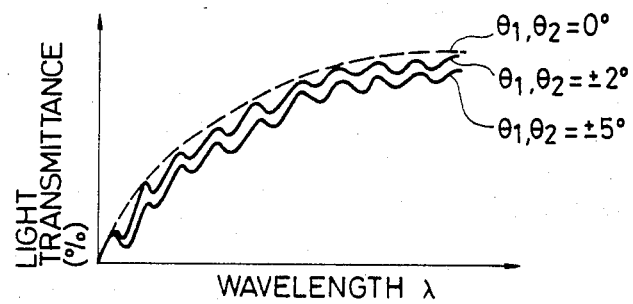

In the first embodiment of the present invention shown in FIG. 3, the difference between $\theta_1$ and $\theta_2$ is within ±3° for the following reasons. FIG. 5 is a diagram showing the wavelength dependence of the light transmittance when the light is incident at right angles ($\phi=0$) to the main surfaces of the uniaxially stretched polyester films 12a, 12b in the liquid crystal display shown in FIG. 3. FIG. 5(a) shows the case when a 100 μm thick uniaxially stretched polyester film is used and FIG. 5(b) shows the case when a 100 μm thick biaxially stretched polyester film of the prior art is used.

When the $\theta_1$ and $\theta_2$ values are zero degree, the wavelength characteristics of the light transmittance show the flat characteristics but as these values become greater, the light transmittance ratio decreases due to birefringence.

Figure 6:
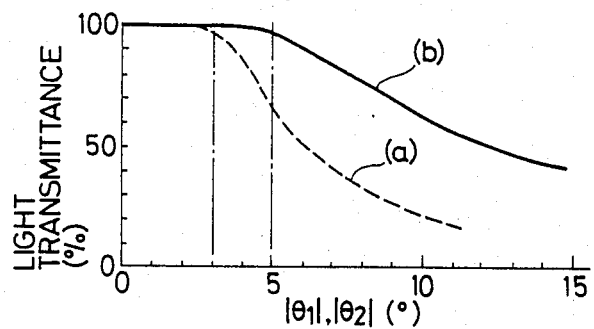
FIG. 6 is a diagram showing the $\theta_1$, $\theta_2$ dependence of the light transmittance in FIG. 5.

FIG. 6 shows the integration value of the wavelength characteristics of FIG. 5, that is, the $\theta_1$, $\theta_2$ dependence of the light transmittance ratio for the white light. Symbols (a) and (b) represent the uniaxially stretched polyester film and the biaxially stretched polyester film, respectively.

As can be understood from the diagram, the light transmittance of the uniaxially stretched polyester film drops markedly when the values $\theta_1$ and $\theta_2$ become greater than ±3° and the light transmittance of the biaxially stretched polyester film decreases when the values become greater than ±5°. When the uniaxially stretched polyester film is used, therefore, the light transmittance becomes at least 95% and equal to that of the glass sheet when either of the two uniaxially stretched polyester films 12a and 12b, which has the greatest refractive index in the direction of the slow and fast principal axes of birefringence, is disposed so that the angle defined between it and the direction of the axis of polarization of the polarizer 11 is within ±3°, and when the biaxially stretched polyester film is used, the light transmittance becomes at least 95% and equal to that of the glass sheet if this angle is within ±5°.

Figure 7:
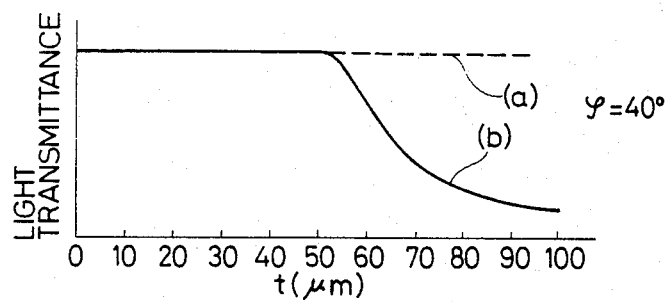
FIG. 7 is a diagram showing the relation between the film thickness t and the light transmittance when $\phi$ of the stretched polyester film is 40° in the first embodiment of the present invention and the relation in the prior art.

FIG. 7 is a diagram showing the relation between the thickness t of the stretched polyester films 12a, 12b and the light transmittance when $\phi=40°$. FIG. 7(a) shows the case in which the uniaxially stretched polyester film is used in such a manner that $\theta_1$ and $\theta HD 2$ are within ±3° while FIG. 7(b) shows the case in which the biaxially stretched polyester film of the prior art is used in such a manner that $\theta_1$ and $\theta_2$ are within ±5°. When the uniaxially stretched polyester film is used so that the values of the angles $\theta_1$ and $\theta_2$ defined between the direction D of the axis of polarization of the polarizer 11 and the direction a of the slow and fast principal axes of birefringence of the stretched film are within ±3°, the occurrence of the color of interference resulting from birefringence and hence, the drop of display quality, can be eliminated. Even if the $\theta_1$, $\theta_2$ values of the biaxially stretched polyester films are set within ±5°, on the other hand, the light transmittance would drop due to birefringence if the film thickness t exceeds 50 μm. This phenomenon is believed to result from the fact that molecular orientation within the film surfaces develops also in the direction perpendicular to the direction of the axis of polarization of the polarizer due to biaxial stretching.

The viewing angle properties of the stretched polyester films 12a, 12b per se will be explained with reference to FIGS. 8 through 10 in order to further clarify the difference between the biaxially stretched polyester film and the uniaxially stretched polyester film.

Figure 8:
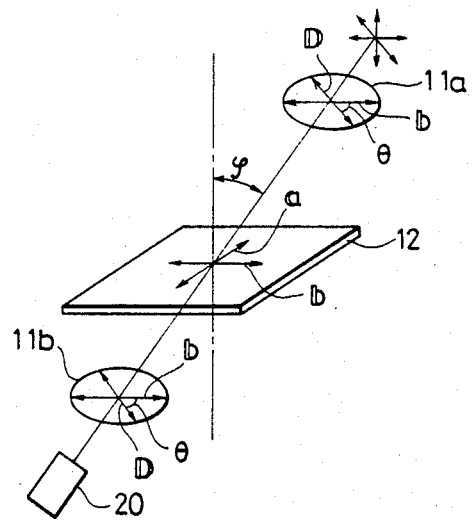
FIG. 8 is a schematic view useful for explaining a method of measuring the quantity of transmitting light in the stretched polyester film.

In FIG. 8, the stretched polyester film 12, the polarizers 11a, 11b and an analyzer 20 are arranged in such a fashion that the light transmitting through the polarizer 11a is incident to the stretched polyester film 12 and the light passing through the stretched polyester film 12 and the polarizer 11b is detected by the analyzer 20. In this case, the direction D of the axes of polarization of the polarizers 11a, 11b is the same as the angle θ of the direction of one b of the slow and fast principal axes of birefringence of the stretched polyester film 12.

Figure 9:
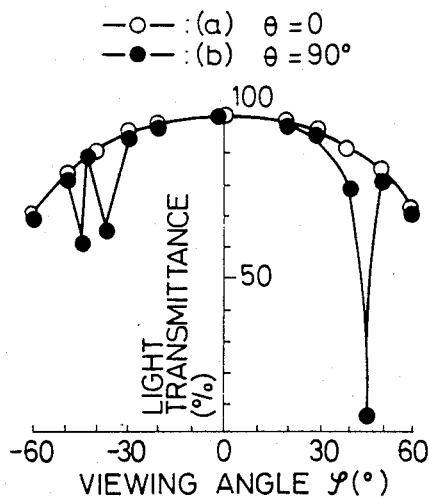
FIG. 9 is a diagram showing the light transmittance characteristics of the biaxially stretched polyester film used in the prior art.

FIG. 9 shows the dependence of the light transmittance upon the angle of incidence φ measured by the analyzer 20 when the direction D of the axis of polarization is in agreement with the direction of the slow and fast principal axes of birefringence a, b of the biaxially stretched polyester film 12. Similarly, FIG. 10 shows the dependence when the uniaxially stretched polyester film is used.

Figure 10:
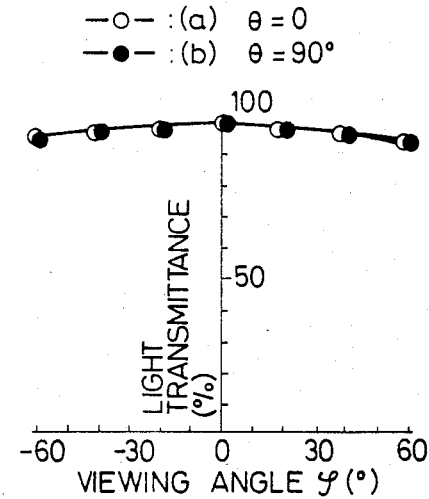
FIG. 10 is a diagram showing the light transmittance characteristics of the uniaxially stretched polyester film used in the present invention.

In FIGS. 9 and 10, symbol (a) represents the case in which the direction D of the axes of polarization 11a, 11b is in agreement with one b of the slow and fast principal axes of birefringence (that is, θ=0°) and (b) does the case in which it is in agreement with the other of the slow and fast principal axes of birefringence (that is, θ=90°).

It can be seen by comparing these diagrams that the light transmittance does not much change even if the angle of incidence φ becomes great in the case of the uniaxially stretched polyester film shown in FIG. 10 but it drastically drops in the case of the biaxially stretched polyester film shown in FIG. 9 if the absolute value |φ| becomes 30° or more. Particularly when θ=90°, this tendency becomes all the more remarkable.

It can be thus understood that the dependence upon the angle of incidence is smaller and the viewing characteristics are better in the uniaxially stretched polyester film than in the biaxially stretched polyester film.

This embodiment exhibits substantially the same performance as a display panel using the glass sheet (optically isotropic material).

Figure 11:
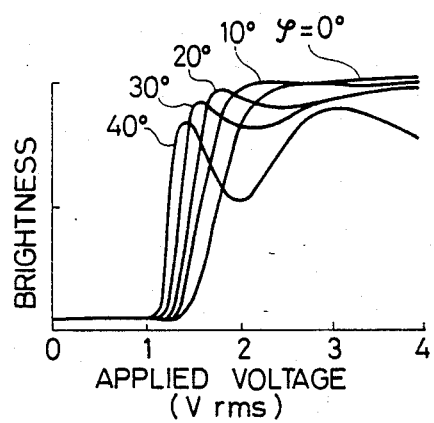
FIG. 11 is a diagram showing the voltage dependence of brightness at an angle of incidence $\phi$ in the first embodiment of the present invention.
Figure 12:
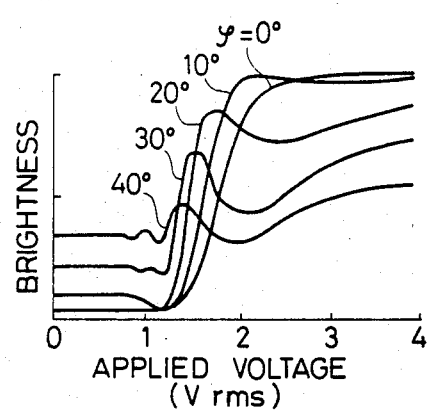
FIG. 12 is a diagram showing the voltage dependence of brightness at an angle of incidence $\phi$ when the conventional biaxially stretched polyester film is used.
Figure 13:
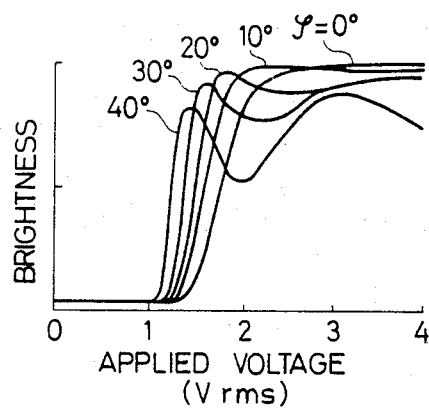
FIG. 13 is a diagram showing the voltage dependence of brightness at an angle of incidence $\phi$ when the conventional glass sheet is used.

FIG. 11 is a diagram showing the voltage dependence of brightness at each angle of incidence φ when the light is incident to the main surface of a TN type liquid crystal panel at the angle of incidence φ. FIG. 12 shows the voltage dependence in the case of the biaxially stretched polyester film of the prior art and FIG. 13 does that of the glass sheet of the prior art. In FIGS. 11 through 13, the applied voltage is a 1 KHz square wave alternating current and the voltage is raised from 0 V to 4 V at a rate of approximately 1.5 V/min.

It can be seen by comparing FIG. 11 with FIG. 13 that the embodiments of the present invention exhibits substantially the same performance as that of the display panel using the glass sheet (optically isotropic material) as the substrates. The embodiment provides a display panel in which the drop of the light transmittance due to interference is lesser, the contrast ratio is greater and the display quality is higher than the display panel using the biaxialy stretched polyester film of the prior art.

EMBODIMENT 2

Figure 14:
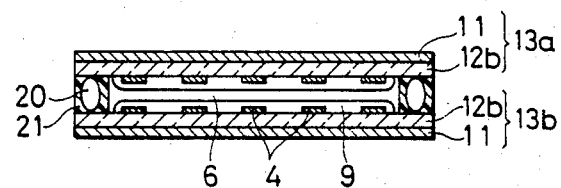
FIG. 14 is a schematic sectional view of the second embodiment of the present invention.

FIG. 14 shows the second embodiment of the present invention which is the same as the first embodiment shown in FIG. 3 except that the outer uniaxially stretched polyester film 12a is not disposed.

This embodiment can accomplish the same effect as that of the first embodiment.

EMBODIMENT 3

Figure 15:
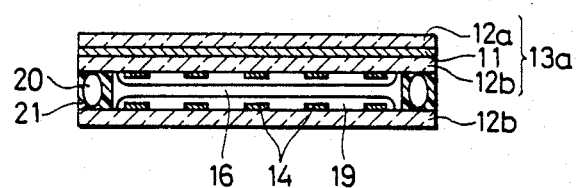
FIG. 15 is a schematic sectional view of the third embodiment of the present invention.

FIG. 15 shows the third embodiment of the present invention which uses a quest-host type liquid crystal 16 (which is prepared, for example, by mixing a "PCH type liquid crystal ZLI-1132" of Merck Co. with a 94 wt % cholesteric liquid crystal "CB-15" and a 3 wt % dichroic dye "GB-10"). This embodiment is the same as the first embodiment except that the polarizer 11 is disposed on only one 13a of the substrates.

The same effect as that of the first embodiment can also be accomplished in this embodiment.

A preferred example of the uniaxially stretched polyester film to be used in the present invention is a uniaxially stretched polyethylene terephthalate film but films made of uniaxially stretched polyethylene isophthalate, uniaxially stretched polyphenylene isophthalate, polybutylene terephthalate and the like may also be used.

Among the pair of substrates, one may be composed of the uniaxially stretched polyester film with the other consisting of glass or the like, and a strong dielectric may also be used as the display member.

It is to be understood by those skilled in the art that the foregoing description is some preferred embodiments of the invention and various changes and modifications may be made without departing from the spirit and scope thereof.

What is claimed is:

1. In a display panel comprised of a pair of substrates whose opposed surfaces are equipped with transparent conductive layers and at least one of which comprises an organic polymer film and a polarizer disposed adjacent to said polymer film, and of a display member interposed between said pair of substrates, the improvement wherein said organic polymer film is a uniaxially stretched polyester film selected from the group consisting of uniaxially stretched polyethylene terephthalate, uniaxially stretched polyethylene isophthalate, uniaxially stretched polyphenylene isophthalate and uniaxially stretched polybutylene terephthalate; the angle defined between the slow and fast principal axes of birefringence of said uniaxially stretched polymer film and the direction of the axis of polarization of said polarizer is within approximately ±3°.

2. The display panel as defined in claim 1 wherein said display member is a liquid crystal.

3. The display panel as defined in claim 1 which further includes a reflecting plate adjacent to one of said substrates.

4. The display panel as defined in claim 1 wherein each of said substrates consists of said uniaxially stretched polyester film and a polarizer disposed adjacent to said uniaxially stretched polyester film.

5. The display panel as defined in claim 4 wherein said uniaxially stretched polyester film is coated on both main surfaces of said polarizer.

6. The display panel as defined in claim 1 wherein the direction of the slow and fast principal axes of birefringence is the direction of the slow and fast principal axes of birefringence of said uniaxially stretched polyester film which has the greatest refractive index among a plurality of directions of said film.

7. The display panel as defined in claim 1, wherein said uniaxially stretched polyester film is uniaxially stretched polyethylene terephthalate.

* * * * *